US008258766B1

(12) United States Patent
Sutardja (10) Patent No.: US 8,258,766 B1
(45) Date of Patent: Sep. 4, 2012

(54) POWER MANAGEMENT SYSTEM WITH DIGITAL LOW DROP OUT REGULATOR AND DC/DC CONVERTER

(75) Inventor: Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 614 days.

(21) Appl. No.: 12/356,172

(22) Filed: Jan. 20, 2009

Related U.S. Application Data (60) Provisional application No. 61/022,702, filed on Jan. 22, 2008.

(51) Int. Cl.
*G05F 1/00* (2006.01)

(52) U.S. Cl. ........................................ 323/282; 323/284

(58) Field of Classification Search ................. 323/222, 323/273, 274, 275, 279, 280, 281, 293, 268, 323/269, 271, 272, 908; 700/297
See application file for complete search history.

(56) References Cited

U.S. PATENT DOCUMENTS

| | | | |
|---|---|---|---|
| 6,472,856 B2 * | 10/2002 | Groom et al. ................. | 323/284 |
| 6,759,836 B1 * | 7/2004 | Black, Jr. ...................... | 323/288 |
| 6,946,821 B2 * | 9/2005 | Hamon et al. ................. | 323/273 |
| 6,989,659 B2 * | 1/2006 | Menegoli et al. ............. | 323/274 |
| 7,397,151 B2 * | 7/2008 | Ishino ........................... | 307/150 |
| 7,531,995 B2 * | 5/2009 | Hara et al. .................... | 323/281 |
| 7,719,241 B2 * | 5/2010 | Dean ............................. | 323/273 |
| 7,728,550 B2 * | 6/2010 | Carr et al. ..................... | 320/107 |
| 2003/0009702 A1 | 1/2003 | Park | |
| 2003/0111985 A1 * | 6/2003 | Xi ................................. | 323/273 |
| 2006/0158165 A1 * | 7/2006 | Inn et al. ....................... | 323/280 |
| 2006/0273771 A1 * | 12/2006 | van Ettinger et al. ......... | 323/273 |

\* cited by examiner

*Primary Examiner* — Adolf Berhane
*Assistant Examiner* — Lakaisha Jackson (57) ABSTRACT

A digital low dropout regulator is disclosed. The digital low dropout regulator includes a switch, a resistive element, a capacitive element coupled to the resistive element at a node, and a switch controller. The switch controller is configured to: couple to the node to receive an output voltage, compare the output voltage to a reference voltage, and control the switch based on a comparison of the output voltage and the reference voltage. The switch is configured to selectively provide a supply voltage to the node via the resistive element.

17 Claims, 12 Drawing Sheets

POWER MANAGEMENT SYSTEM WITH DIGITAL LOW DROP OUT REGULATOR AND DC/DC CONVERTER

CROSS-REFERENCE TO RELATED APPLICATIONS

This application claims the benefit of U.S. Provisional Application No. 61/022,702, filed on Jan. 22, 2008. The disclosure of the above application is incorporated herein by reference in its entirety.

FIELD

The present disclosure relates to power management systems, and more particularly to power management systems for integrated circuits (ICs) and systems on chip (SOCs).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Both linear voltage regulators and DC/DC converters have been used to supply regulated power to circuits of a device. Linear voltage regulators typically include a transistor that drops an input voltage to a regulated output voltage. DC/DC converters typically include one or more diodes, switches, capacitances and/or inductances that store and release power. DC/DC converters can provide regulated output voltage both above and below the input voltage.

Low-dropout (LDO) regulators are one type of linear voltage regulator. Dropout refers to a minimum difference between input and output voltage that sustains regulation. Although the efficiency of the LDO regulator is generally lower than the DC/DC converter, it may be offset by the relatively low cost of the LDO regulator.

When systems employ both LDO regulators and DC/DC converters to supply power to the circuits of the device, there can be situations when the LDO regulator will experience voltage droop. The droop in voltage may fall below a voltage or power level floor required for the circuit.

Figure 1A:
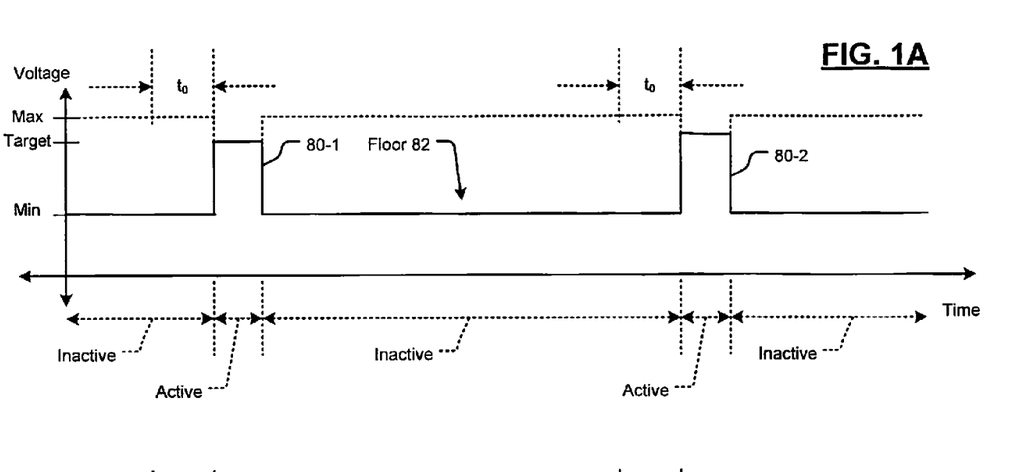
FIG. 1A is a graph of ideal output voltage as a function of time based on the output of a DC/DC converter and a LDO regulator.

FIG. 1A is a diagram showing ideal output voltage as a function of time based on output of a DC/DC converter and a LDO regulator that are used to drive a circuit. During an active or high power (HP) mode, the DC/DC converter supplies power to a target level as shown at 80. During a standby or low power (LP) mode, the DC/DC converter is generally or substantially turned off. During this period, the LDO regulator takes over and ensures that a minimum average voltage (or power) is maintained at a minimum level as identified by 82. The minimum average power may allow the modules of a driven circuit to maintain states and/or to reduce start-up delay that may otherwise occur if power was not supplied during the standby mode.

Consequently, the DC/DC converter supplies power during the active mode while the LDO regulator maintains the floor during the standby mode. During a period $t_0$ prior to transitioning to the active mode, the driven circuit may start using a little more power to initiate turning-on one or more of the other modules of the circuit so that they can be ready to operate in the active mode. During the period $t_0$, the LDO regulator is operating to ensure that minimum power or the floor 82 is supplied to the circuit. As a result of the increase in power supplied to the circuit, $V_{out}$ may droop below the floor 82 to be maintained by the LDO regulator.

Figure 1B:
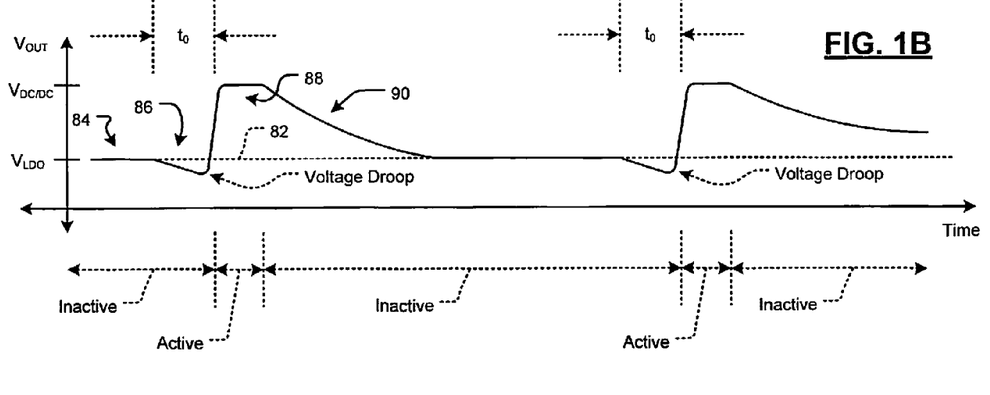
FIG. 1B is a graph of typical output voltage as a function of time based on the DC/DC converter and the LDO regulator.

FIG. 1B is a diagram showing a typical output voltage $V_{out}$ as a function of time based on the output of the DC/DC converter and the LDO regulator. The voltage is maintained at the floor 82 as shown at 84 by the LDO regulator. Then, the voltage droops below the floor 82 as shown at 86 during the period $t_0$. Then, the voltage increases at 88 due to the output of the DC/DC converter increasing and supplying an active voltage level. Then, the voltage falls after the active mode ends and the DC/DC converter is off. A rate or time constant of the falloff may be based on values of components of the impedance (and possibly other circuit impedances) and a rate of power consumption by the driven circuit.

SUMMARY

In one aspect, a digital low dropout regulator is disclosed. The digital low dropout regulator includes a switch, a resistive element, a capacitive element coupled to the resistive element at a node, and a switch controller. The switch controller is configured to: couple to the node to receive an output voltage, compare the output voltage to a reference voltage, and control the switch based on a comparison of the output voltage and the reference voltage. The switch is configured to selectively provide a supply voltage to the node via the resistive element.

In another aspect, a power management system is disclosed. The power management system includes an active path comprising a DC/DC converter, a standby path comprising a comparator coupled to a node to receive an output voltage, and a pulse generator. The comparator is configured to control the pulse generator based on comparison of the output voltage to a reference voltage. The power management system further includes one or more switches, and a multiplexer coupled to the active path and the standby path and configured to selectively control the one or more switches using one of the active path and the standby path. The power management system also includes an impedance circuit comprising an inductive element coupled to the one or more switches, and a capacitive element coupled to inductive element and the node. The impedance circuit is coupled to the one or more switches.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The power management system according to the present disclosure temporarily powers the DC/DC converter one or more times during an standby mode of a device (such as an SOC, IC or other circuit) to increase supply voltage and to prevent voltage droop below a floor maintained by the digital LDO regulator. The DC/DC converter may generate a minimum pulse sufficient to prevent voltage droop. After temporarily being powered during the standby mode, the DC/DC converter is turned off until the active mode begins. An impedance circuit may provide temporary power storage until the active mode begins. More efficient operation of the power management system may tend to reduce power consumption. This may be particularly desirable for battery-powered devices.

Figure 2:
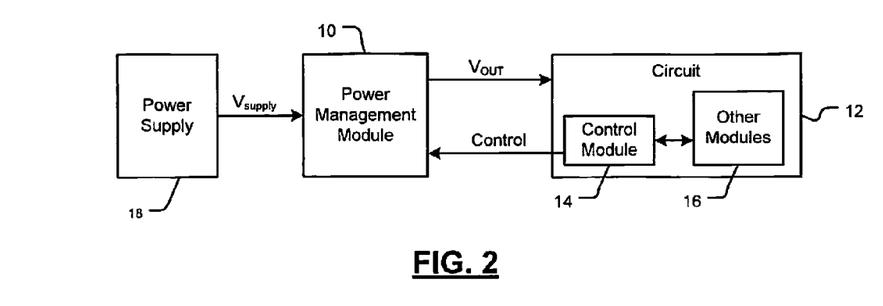
FIG. 2 is a functional block diagram illustrating a power management system including a digital LDO regulator and a DC/DC converter that supply power to a system on chip (SOC), an integrated circuit (IC) or other circuits.

Referring now to FIG. 2, a power management module 10 supplies power to a system on chip (SOC), an integrated circuit (IC) or other circuit generally identified at 12. The circuit 12 may include a mode control module 14 and other modules 16. The mode control module 14 generates mode control signals that control a power mode of the circuit 12, as will be described further below. The power management module 10 may receive a supply voltage $V_{supply}$ from a power supply 18. The power supply 18 may be powered by line voltage, a battery and/or other power source.

Figure 3A:
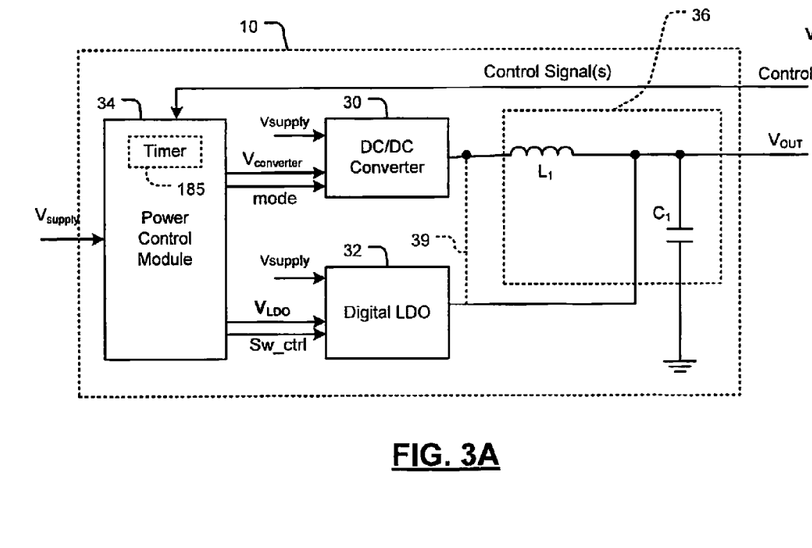
FIG. 3A is a functional block diagram illustrating the power management system in further detail.

Referring now to FIG. 3A, the power management module 10 is illustrated in further detail. The power management module 10 includes a DC/DC converter 30, a digital LDO regulator 32 and a power control module 34. The DC/DC converter 30 may comprise any suitable DC/DC converter. The power control module 34 receives a power supply voltage $V_{supply}$ and outputs a converter voltage $V_{converter}$ and a digital LDO voltage $V_{LDO}$ to the DC/DC converter 30 and the digital LDO regulator 32, respectively. The power control module 34 also turns the DC/DC converter 30 on and off via a mode signal and turns the digital LDO regulator on and off via the sw_ctrl signal as will be described below.

Outputs of the DC/DC converter 30 and the digital LDO regulator 32 communicate with an impedance 36 that may include one or more inductances, resistances and/or capacitances. For example only, the impedance 36 may comprise an inductance $L_1$ and a capacitance $C_1$. For example only, an output of the DC/DC converter 30 may communicate with one end of the inductance $L_1$. Another end of the inductance $L_1$ may communicate with an output of the digital LDO regulator 32 and with one end of a capacitance $C_1$. Alternately, the digital LDO regulator 32 may communicate with the one end of the inductance $L_1$ instead of the other end as shown by dotted line 39. A voltage $V_{out}$ is supplied to the circuit 12.

Figure 3B:
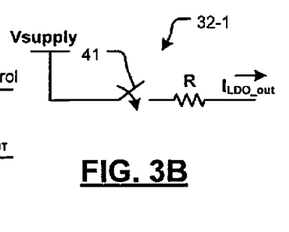
FIG. 3B is an electrical schematic of an exemplary digital LDO regulator.
Figure 3C:
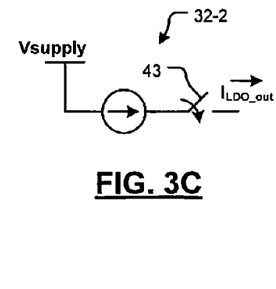
FIG. 3C is an electrical schematic of another exemplary digital LDO regulator.

Referring now to FIGS. 3B and 3C, exemplary digital LDO regulators are shown. In FIG. 3B, a digital LDO regulator 32-1 includes a switch 41 that receives a switch control signal and that connects a resistance R with a voltage source providing $V_{supply}$. The digital LDO regulator 32-1 outputs digital LDO regulator current $I_{LDO\_out}$. The resistance R and capacitor $C_1$ are used collectively to control any ripple effects on voltage $V_{out}$. In FIG. 3C, another exemplary digital LDO regulator 32-2 includes a switch 43 that selectively connects a current source $I_{LDO}$ with an output of the digital LDO regulator 32-2. The digital LDO regulator 32-2 outputs digital LDO regulator current $I_{LDO\_out}$.

Figure 3D:
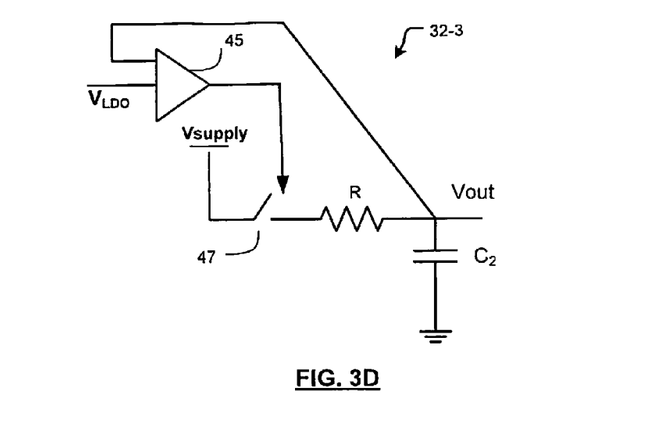
FIG. 3D is an electrical schematic of another exemplary digital LDO regulator.

FIG. 3D illustrates another exemplary digital LDO regulator 32-3 which includes a switch 47 that selectively connects voltage $V_{supply}$ to voltage $V_{out}$ via resistance R. $V_{supply}$ may be any voltage that is greater than $V_{out}$. The switch 47 is controlled by a switch controller 45 based on a comparison of the voltage $V_{out}$ with a reference voltage $V_{LDO}$. The switch controller 45 may include a low power comparator. When in inactive (standby) or low power mode, the switch controller 45 determines whether $V_{out}$ is less than or equal to the reference voltage $V_{LDO}$. If Vout is less than or equal to the reference voltage $V_{LDO}$, then the switch controller 45 turns on the switch 47, thereby bringing up $V_{out}$. Capacitance $C_2$ is sufficiently large such that the ripple voltage $V_{ripple}$ at $V_{out}$ should be less than 100 mV. The value of capacitance $C_2$ is determined based on the relative value of resistance R. Resistance R may be implemented in a number of ways, e.g., by using a resistor, a capacitor or any other current-limiting element(s) or configuration(s).

Figure 3E:
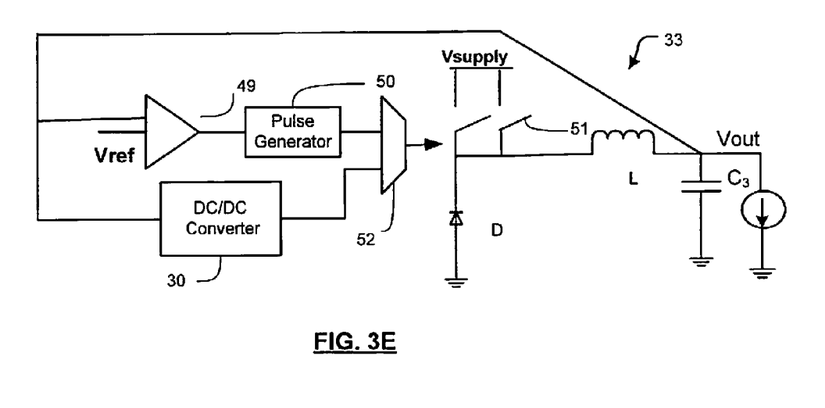
FIG. 3E is an electrical schematic of a circuit configuration that includes the DC/DC converter, the digital LDO regulator and an impedance circuit.

FIG. 3E illustrates a circuit configuration 33 that includes the DC/DC converter 30. The circuit configuration 33 includes a standby path and an active path. The standby path includes a comparator 49 that is low power and a pulse generator 50. The comparator 49 controls the pulse generator 50 based on a comparison of a reference voltage $V_{ref}$ and the voltage $V_{out}$. For example, during the standby mode, the comparator 49 may determine whether $V_{out}$ is less than or equal to a reference voltage $V_{ref}$. The pulse generator 50, in turn, generates pulses to control the switches 51 via the multiplexer 52. During the standby or low power mode, the pulse generator 51 utilizes minimum pulses which are narrow thereby consuming minimal energy. Furthermore, the gap between adjacent pulses is longer than usual. The standby path is used when the standby mode is engaged.

The active path includes the DC/DC converter 30. The active path is used when the active mode is engaged. The multiplexer 52 is used to selectively engage the standby path and the active path.

Output of the multiplexer 52 is used to control two or more switches 51. One or more of the switches 51 may be switched on providing the appropriate voltage level to $V_{out}$. The circuit configuration 33 also includes a number of components constituting an impedance circuit. The impedance circuit includes a diode emulator D, an inductor L, a capacitor $C_3$ and a current source.

Figure 4A:
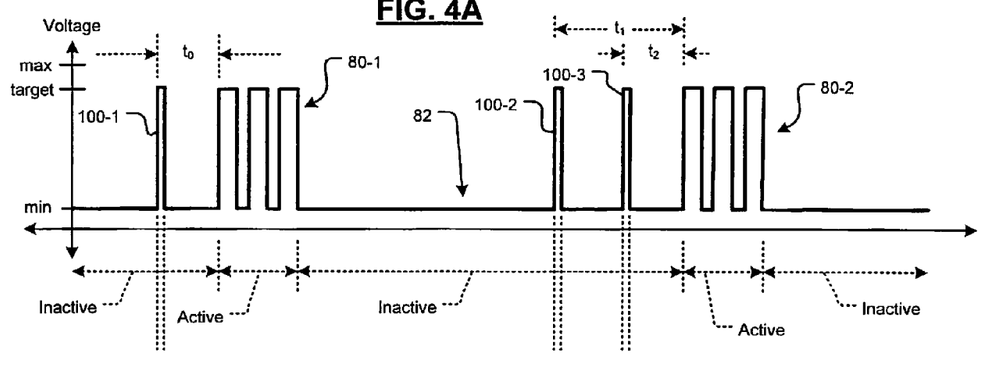
FIG. 4A is a graph of ideal voltage as a function of time for the output of the DC/DC converter and the digital LDO regulator according to an exemplary implementation of the present disclosure.

Referring now to FIG. 4A, voltage is shown as a function of time for the output of the DC/DC converter 30 and the digital LDO regulator 32 according to exemplary implementations of the present disclosure as shown in FIGS. 3A, 3D and 3E. The mode control module 14 of the circuit 12 may generate a pre-active mode signal during the standby or inactive mode before the predetermined period $t_0$. This time is before the circuit 12 transitions to a high power (HP) mode. The pre-active mode signal may be generated before the circuit 12 starts powering circuits to transition one or more of the other control modules 16 to the active mode.

The mode control module 14 may also generate an active mode signal to transition the circuit 12 to the active mode. The active mode signal may also be de-asserted to end the active mode. Alternately, the active mode may end a predetermined period after it is initiated.

The control module 34 turns on the digital LDO regulator 32 at 100-1 for a predetermined period based on the pre-active mode signal to increase $V_{out}$ and then turns off the digital LDO regulator 32 before the active mode. As can be appreciated, the predetermined period may be calibrated to provide a minimum pulse width and/or height that is sufficient to provide enough power to prevent droop. As a result, the minimum amount of power may be dissipated by the digital LDO regulator 32. Alternatively, the digital LDO regulator 32 may bring the voltage to a level that is sufficient to operate the circuit 12 in the active mode on a temporary basis. This allows time for the DC/DC converter 30 to wake up and engage in the active mode. The digital LDO regulator 32 may also be kept operational during the standby mode or a portion thereof.

The voltage increases can be performed one or more times at spaced intervals to increase or bump the voltage above the floor. For example only, $V_{out}$ may increase by approximately 100 mV. The predetermined period may be less than the period $t_0$. Then, the control module 34 later turns on the DC/DC converter at 80-1 for the active mode based on the active mode signal. The process may be repeated as shown at 100-3 and 80-2.

Alternatively, the digital LDO regulator 32 may increase the voltage above the floor by monitoring $V_{out}$ against a threshold. For example, referring to FIG. 3D, the digital LDO regulator 32-1 may compare $V_{out}$ to the reference voltage $V_{LDO}$ and control the switch 47 to increase $V_{out}$ accordingly. The voltage increase may be shown schematically as 100-2 in FIGS. 4A and 108-2 in FIG. 4B. Similarly, the standby path in FIG. 3E may also increase the voltage above the floor by monitoring $V_{out}$ against $V_{ref}$ and using the pulse generator 50 to control the switches 51 accordingly.

Figure 4B:
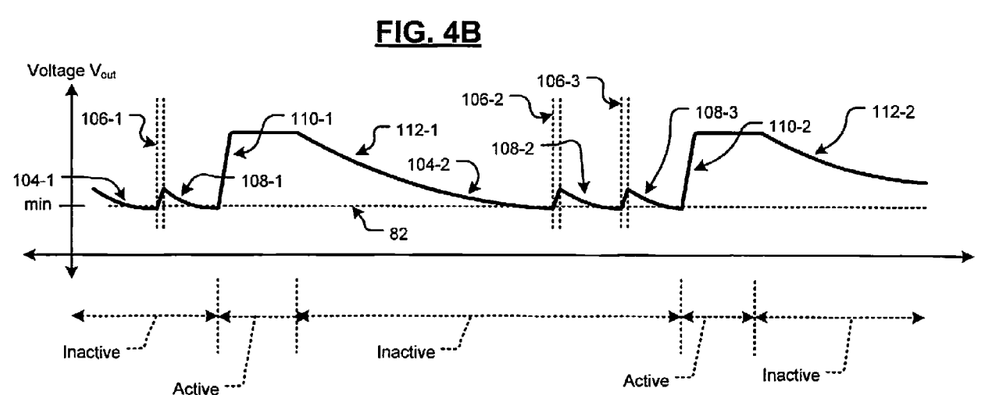
FIG. 4B is a graph of empirical voltage output as a function of time for both the DC/DC converter and the digital LDO regulator in FIG. 4A.

Referring now to FIG. 4B, $V_{out}$ is shown as a function of time for the output of the DC/DC converter 30 and the digital LDO regulator 32 according to an exemplary implementation of the present disclosure. The voltage $V_{out}$ is maintained at the floor at 104-1 by the digital LDO regulator 32. The voltage $V_{out}$ increases at 106-1 due to the digital LDO regulator 32 monitoring the floor 82 to prevent droop below the floor 82. The voltage $V_{out}$ then decreases at 108-1 due to the power drained by the circuit 12. The power may be drained due to circuits in one or more of the other modules 16 being turned on in anticipation of the active mode. Alternatively, the digital LDO regulator 32 may bring the voltage to a level that is sufficient to operate the circuit 12 in the active mode on a temporary basis. This allows time for the DC/DC converter 30 to wake up and engage in the active mode. The voltage $V_{out}$ then increases at 110-1 due to the output of the DC/DC converter 30 being in the active mode. The voltage $V_{out}$ then falls at 112-1 after the active mode ends. The falloff may be at a rate determined by components of the impedance 36 (and other impedances). The foregoing process may also be repeated at 104-2, 106-2, 108-2, 106-3, 108-3, 110-2 and 112-2.

By further adjusting the values of the impedances and the duration and/or number of times that the digital LDO regulator 32 is turned on and off during the standby mode, $V_{out}$ can remain above the floor to significantly reduce power dissipation that would otherwise occur in the digital LDO regulator 32 during the standby mode. Additionally, the digital LDO regulator 32 may be turned on and off at spaced intervals during the standby mode to provide several voltage bumps and droops to maintain the voltage above the floor.

Figure 5:
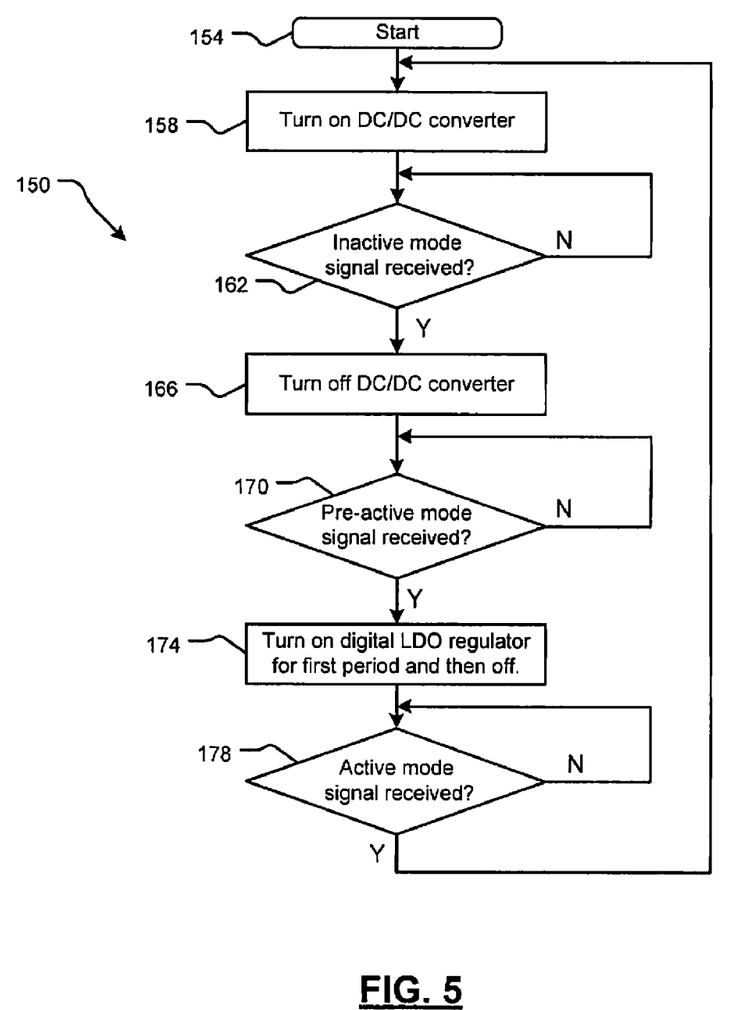
FIG. 5 illustrates an exemplary method for operating the power management system.

Referring now to FIG. 5, an exemplary method 150 for operating the control module 34 is shown. Control begins in step 154 and proceeds to step 158. In step 158, the power management module 10 turns on the DC/DC converter 30. In step 162, the power management module 10 determines whether the standby mode signal is received. If step 162 is false, control returns to step 162. If step 162 is true, control turns off the DC/DC converter 30 in step 166. In step 170, the power management module 10 determines whether the pre-active mode signal has been received. If false, control returns to step 170. If true, control continues with step 174 and turns on the digital LDO regulator 32 for a first predetermined period and then off before the active mode. In step 178, control determines whether the active mode signal is received. If step 178 is true, control returns to step 158. Otherwise if step 178 is false, control returns to step 178.

Figure 6:
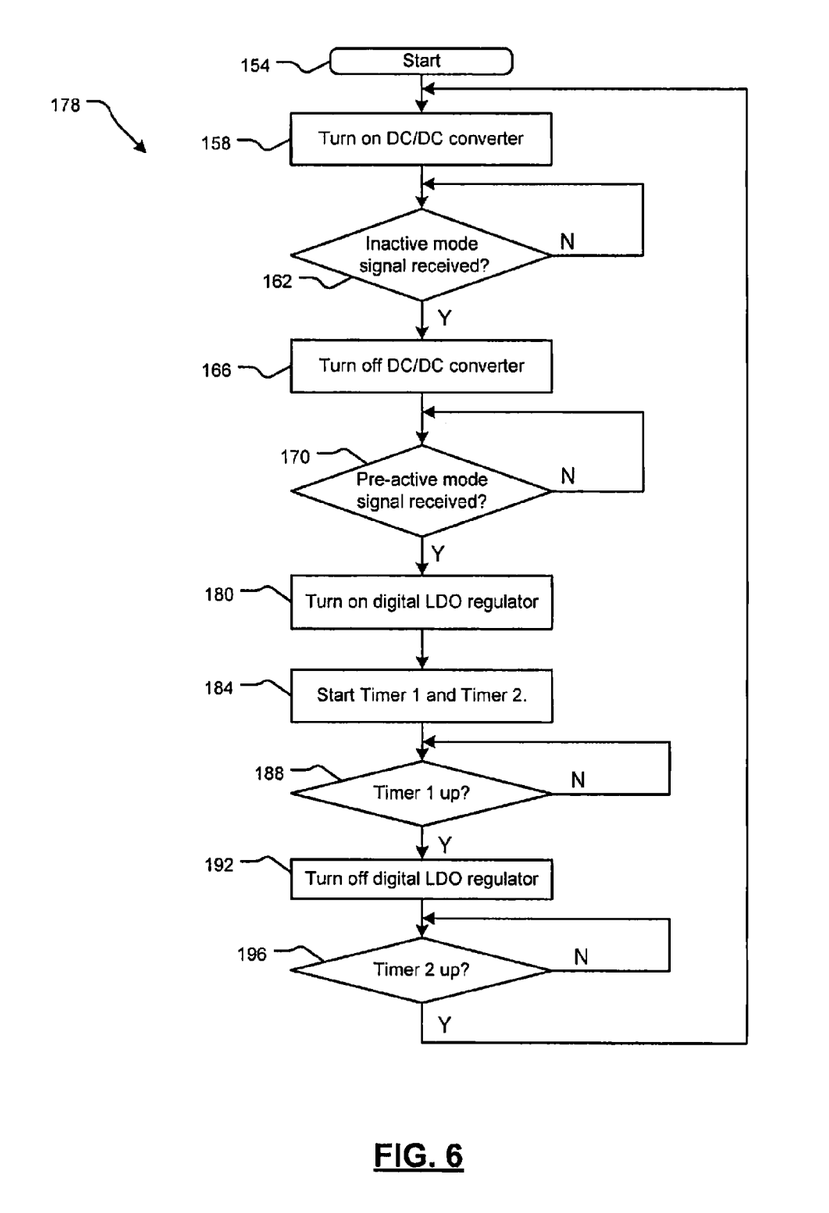
FIG. 6 illustrates another exemplary method for operating the power management module.

Referring now to FIG. 6, another exemplary method 170 for operating the power management module is shown. The power management module 10 may include a timer that determines the start of the active mode based on the pre-active mode signal. In other words, the timer times a period after the pre-active mode signal is received and then transitions to the active mode. Steps 154-170 of FIG. 6 are shown and not described again. In step 180, the digital LDO regulator 32 is turned on. In step 184, a first timer (Timer1) and a second timer (Timer2) are started. Timer 185 in FIG. 3A may be used to implement Timer1 and Timer2. In step 188, the power management module 10 determines whether Timer1 is up. If Timer1 is up, then the digital LDO regulator 32 is turned off in step 192. In step 196, the power management module 10 determines whether Timer2 is up. If Timer2 is up, then the power management module 10 transitions to the HP or active mode and control returns to step 158.

Figure 7:
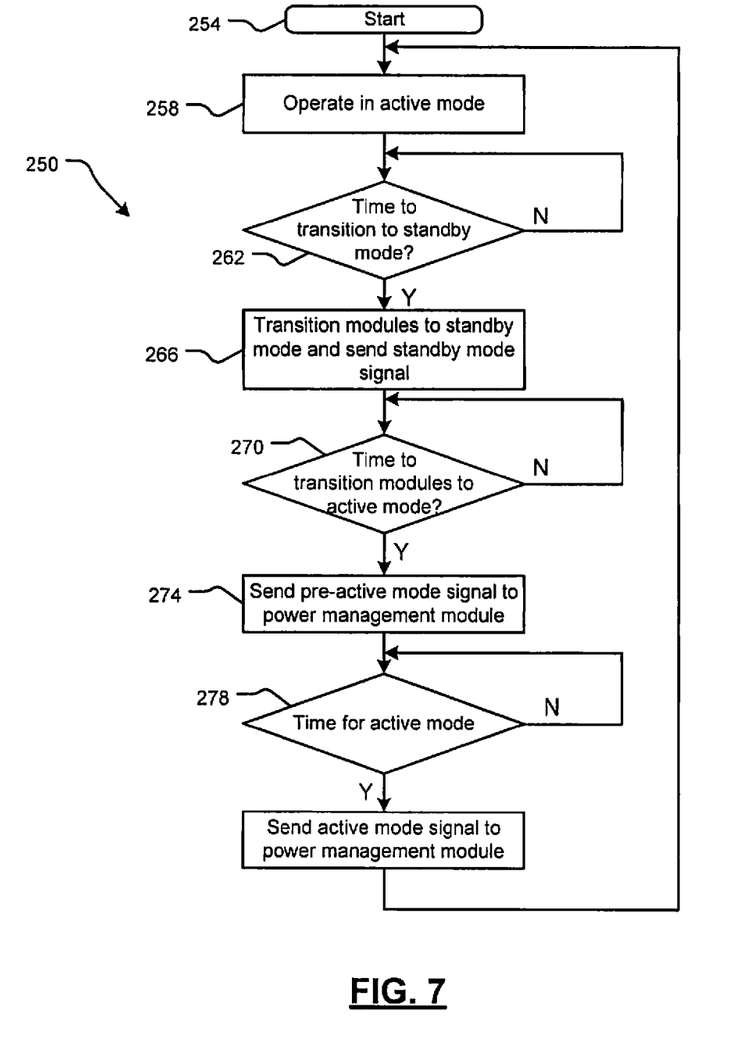
FIG. 7 illustrates an exemplary method for operating the SOC, IC or other circuit.

Referring now to FIG. 7, an exemplary method 250 for operating the circuit 12 is shown. Control begins in step 254 and proceeds to step 258. In step 258, the circuit 12 operates in active mode. In step 262, the circuit 12 determines whether it is time to transition to standby mode. If step 262 is false, control returns to step 262. If step 262 is true, the circuit 12 transitions one or more modules 16 to the standby mode in step 266. In step 270, the circuit 12 determines whether it is time to begin turning on circuits in one or more of the other control modules 16 prior to entering the active mode. If false, control returns to step 270. If true, the circuit 12 continues with step 274 and sends the pre-active mode signal to the power management module 10. When the timer is used in the power management module 10, the active mode signal need not be transmitted to the power management module 10 and control returns to step 258.

When the timer is not used in the power management module 10, the active mode signal may be transmitted to the power management module 10. In step 278, the circuit 12 determines whether it is time to send the active mode signal. If step 278 is true, control sends the active mode signal to the power management module 10 and then control returns to step 258. Otherwise if step 278 is false, control returns to step 278.

Referring now to FIGS. 8A-8G, various exemplary implementations incorporating the teachings of the present disclosure are shown.

Figure 8A:
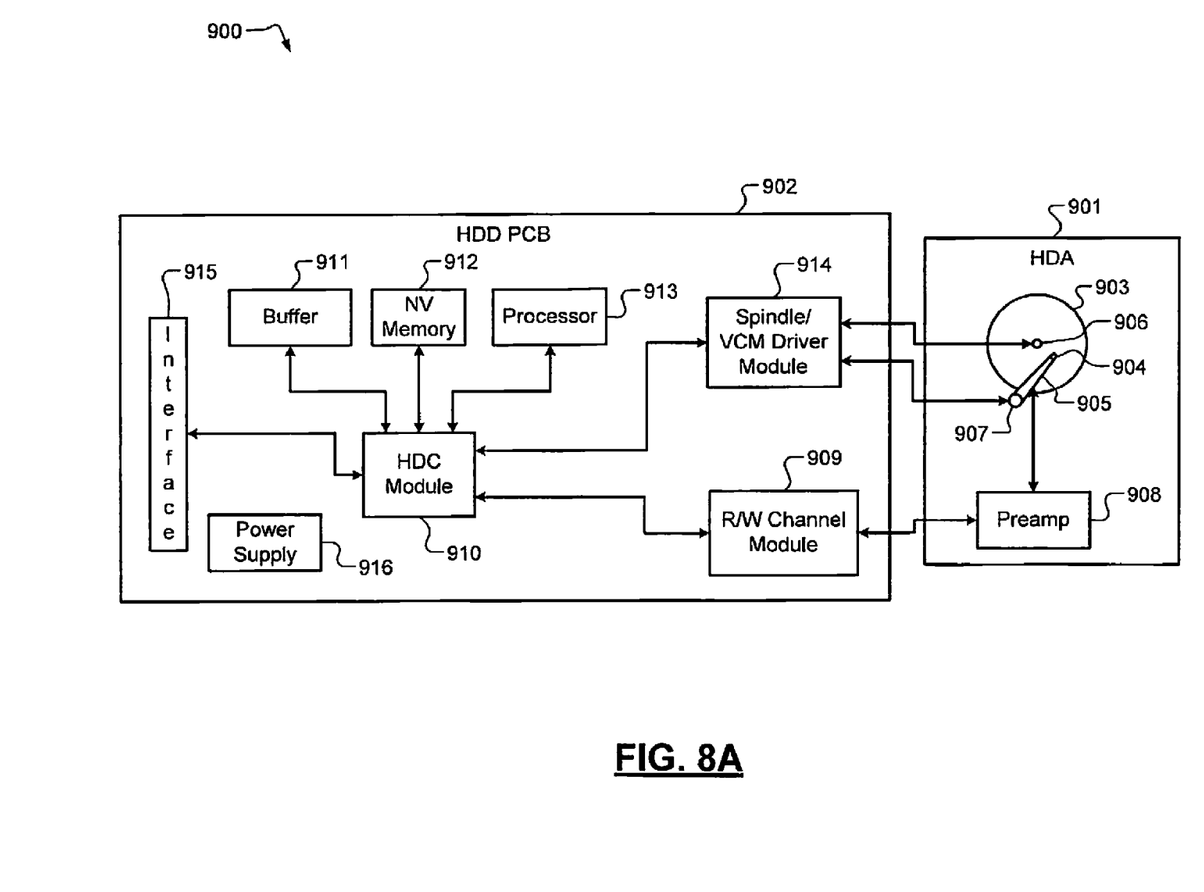
FIG. 8A is a functional block diagram of a hard disk drive.

Referring now to FIG. 8A, the teachings of the disclosure can be implemented in a power supply of a hard disk drive (HDD) 900. The HDD 900 includes a hard disk assembly (HDA) 901 and an HDD printed circuit board (PCB) 902. The HDA 901 may include a magnetic medium 903, such as one or more platters that store data, and a read/write device 904. The read/write device 904 may be arranged on an actuator arm 905 and may read and write data on the magnetic medium 903. Additionally, the HDA 901 includes a spindle motor 906 that rotates the magnetic medium 903 and a voice-coil motor (VCM) 907 that actuates the actuator arm 905. A preamplifier device 908 amplifies signals generated by the read/write device 904 during read operations and provides signals to the read/write device 904 during write operations.

The HDD PCB 902 includes a read/write channel module (hereinafter, "read channel") 909, a hard disk controller (HDC) module 910, a buffer 911, nonvolatile memory 912, a processor 913, and a spindle/VCM driver module 914. The read channel 909 processes data received from and transmitted to the preamplifier device 908. The HDC module 910 controls components of the HDA 901 and communicates with an external device (not shown) via an I/O interface 915. The external device may include a computer, a multimedia device, a mobile computing device, etc. The I/O interface 915 may include wireline and/or wireless communication links.

The HDC module 910 may receive data from the HDA 901, the read channel 909, the buffer 911, nonvolatile memory 912, the processor 913, the spindle/VCM driver module 914, and/or the I/O interface 915. The processor 913 may process the data, including encoding, decoding, filtering, and/or formatting. The processed data may be output to the HDA 901, the read channel 909, the buffer 911, nonvolatile memory 912, the processor 913, the spindle/VCM driver module 914, and/or the I/O interface 915.

The HDC module 910 may use the buffer 911 and/or nonvolatile memory 912 to store data related to the control and operation of the HDD 900. The buffer 911 may include DRAM, SDRAM, etc. Nonvolatile memory 912 may include any suitable type of semiconductor or solid-state memory, such as flash memory (including NAND and NOR flash memory), phase change memory, magnetic RAM, and multi-state memory, in which each memory cell has more than two states. The spindle/VCM driver module 914 controls the spindle motor 906 and the VCM 907. The HDD PCB 902 includes a power supply 916 that provides power to the components of the HDD 900.

Figure 8B:
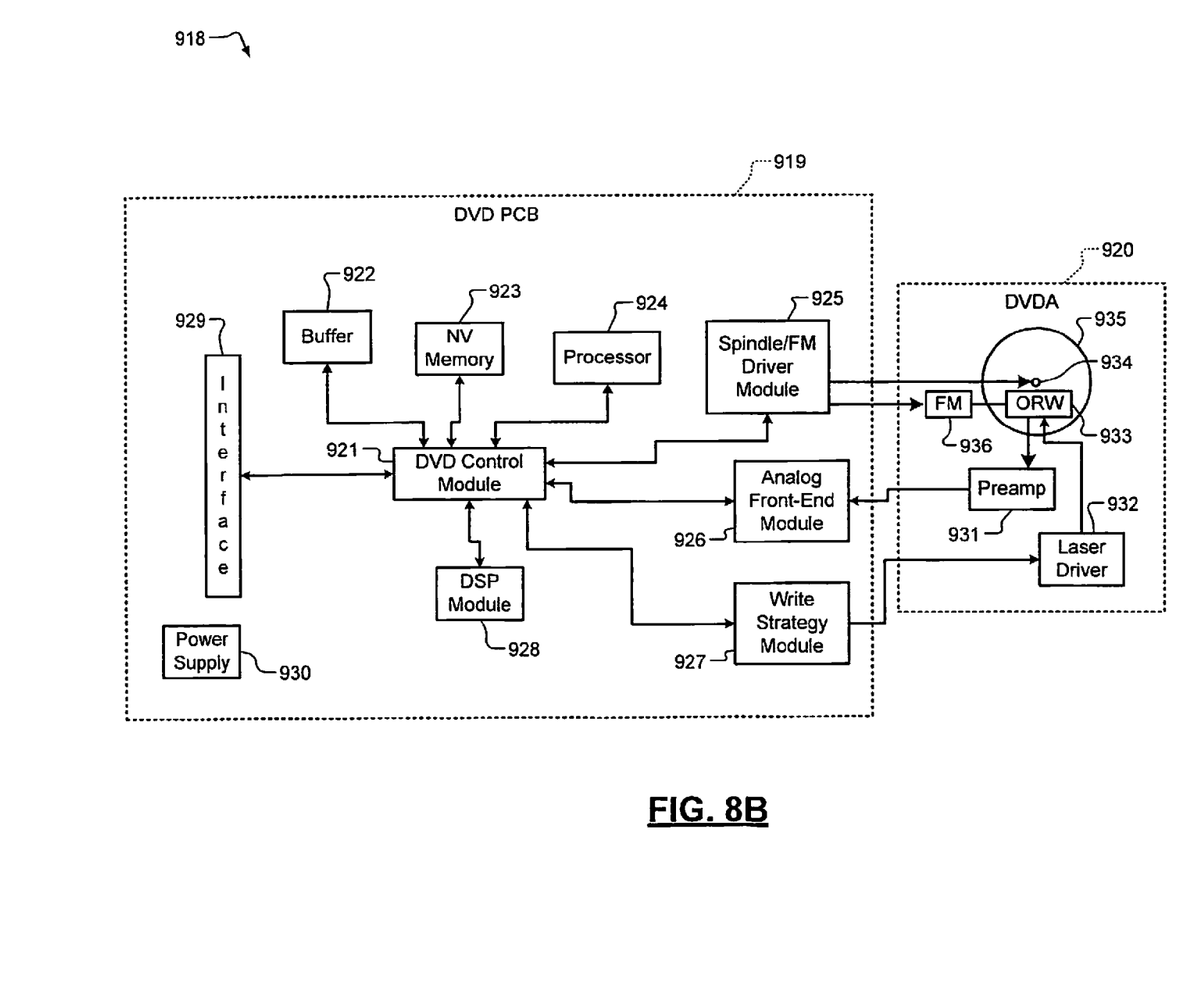
FIG. 8B is a functional block diagram of a DVD drive.

Referring now to FIG. 8B, the teachings of the disclosure can be implemented in a power supply of a DVD drive 918 or of a CD drive (not shown). The DVD drive 918 includes a DVD PCB 919 and a DVD assembly (DVDA) 920. The DVD PCB 919 includes a DVD control module 921, a buffer 922, nonvolatile memory 923, a processor 924, a spindle/FM (feed motor) driver module 925, an analog front-end module 926, a write strategy module 927, and a DSP module 928.

The DVD control module 921 controls components of the DVDA 920 and communicates with an external device (not shown) via an I/O interface 929. The external device may include a computer, a multimedia device, a mobile computing device, etc. The I/O interface 929 may include wireline and/or wireless communication links.

The DVD control module 921 may receive data from the buffer 922, nonvolatile memory 923, the processor 924, the spindle/FM driver module 925, the analog front-end module 926, the write strategy module 927, the DSP module 928, and/or the I/O interface 929. The processor 924 may process the data, including encoding, decoding, filtering, and/or formatting. The DSP module 928 performs signal processing, such as video and/or audio coding/decoding. The processed data may be output to the buffer 922, nonvolatile memory 923, the processor 924, the spindle/FM driver module 925, the analog front-end module 926, the write strategy module 927, the DSP module 928, and/or the I/O interface 929.

The DVD control module 921 may use the buffer 922 and/or nonvolatile memory 923 to store data related to the control and operation of the DVD drive 918. The buffer 922 may include DRAM, SDRAM, etc. Nonvolatile memory 923 may include any suitable type of semiconductor or solid-state memory, such as flash memory (including NAND and NOR flash memory), phase change memory, magnetic RAM, and multi-state memory, in which each memory cell has more than two states. The DVD PCB 919 includes a power supply 930 that provides power to the components of the DVD drive 918.

The DVDA 920 may include a preamplifier device 931, a laser driver 932, and an optical device 933, which may be an optical read/write (ORW) device or an optical read-only (OR) device. A spindle motor 934 rotates an optical storage medium 935, and a feed motor 936 actuates the optical device 933 relative to the optical storage medium 935.

When reading data from the optical storage medium 935, the laser driver provides a read power to the optical device 933. The optical device 933 detects data from the optical storage medium 935, and transmits the data to the preamplifier device 931. The analog front-end module 926 receives data from the preamplifier device 931 and performs such functions as filtering and A/D conversion. To write to the optical storage medium 935, the write strategy module 927 transmits power level and timing data to the laser driver 932. The laser driver 932 controls the optical device 933 to write data to the optical storage medium 935.

Figure 8C:
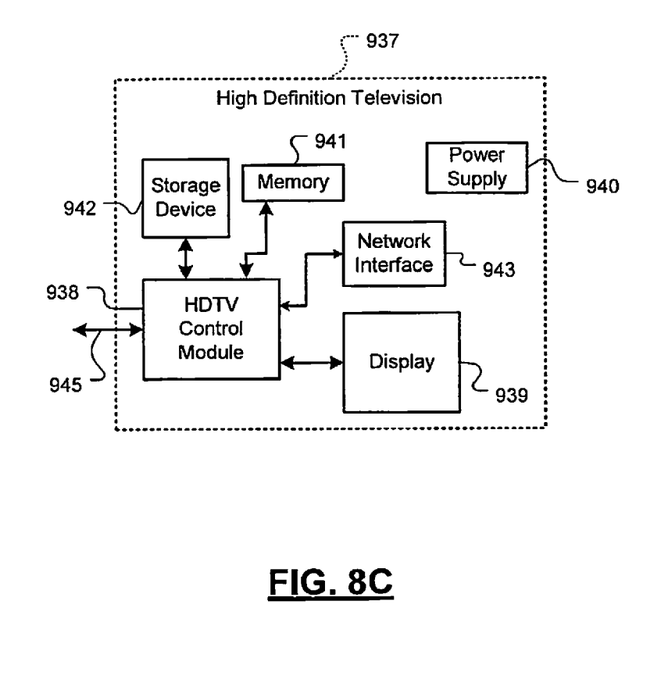
FIG. 8C is a functional block diagram of a high definition television.

Referring now to FIG. 8C, the teachings of the disclosure can be implemented in a power supply of a high definition television (HDTV) 937. The HDTV 937 includes an HDTV control module 938, a display 939, a power supply 940, memory 941, a storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Figure 8D:
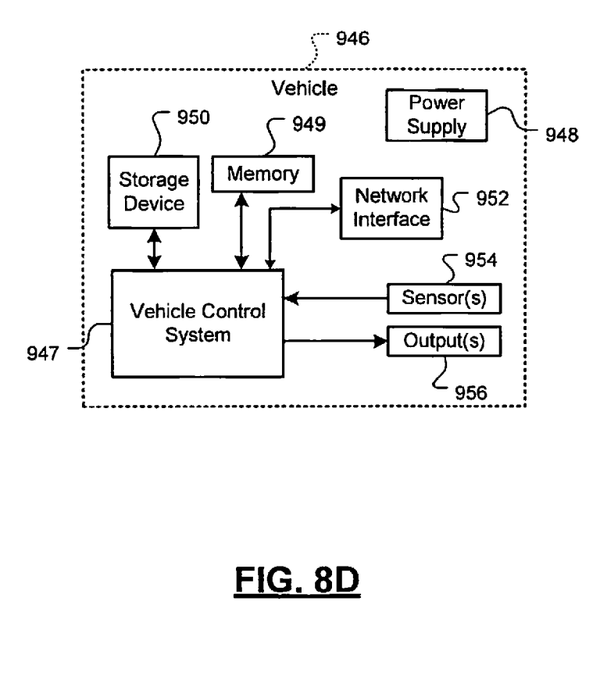
FIG. 8D is a functional block diagram of a vehicle control system.

Referring now to FIG. 8D, the teachings of the disclosure may be implemented in a power supply of a vehicle 946. The vehicle 946 may include a vehicle control system 947, a power supply 948, memory 949, a storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the network interface 952.

Figure 8E:
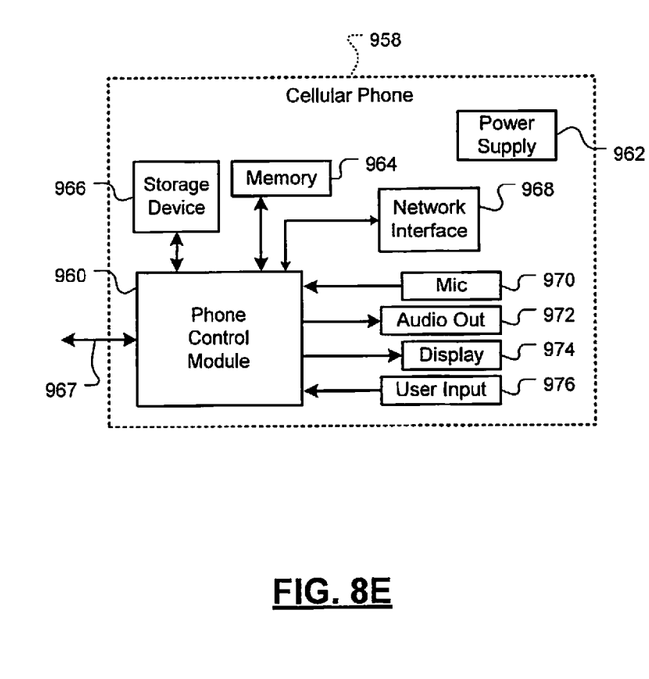
FIG. 8E is a functional block diagram of a cellular phone.

Referring now to FIG. 8E, the teachings of the disclosure can be implemented in a power supply of a cellular phone 958. The cellular phone 958 includes a phone control module 960, a power supply 962, memory 964, a storage device 966, and a cellular network interface 967. The cellular phone 958 may include a network interface 968, a microphone 970, an audio output 972 such as a speaker and/or output jack, a display 974, and a user input device 976 such as a keypad and/or pointing device. If the network interface 968 includes a wireless local area network interface, an antenna (not shown) may be included.

The phone control module 960 may receive input signals from the cellular network interface 967, the network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Figure 8F:
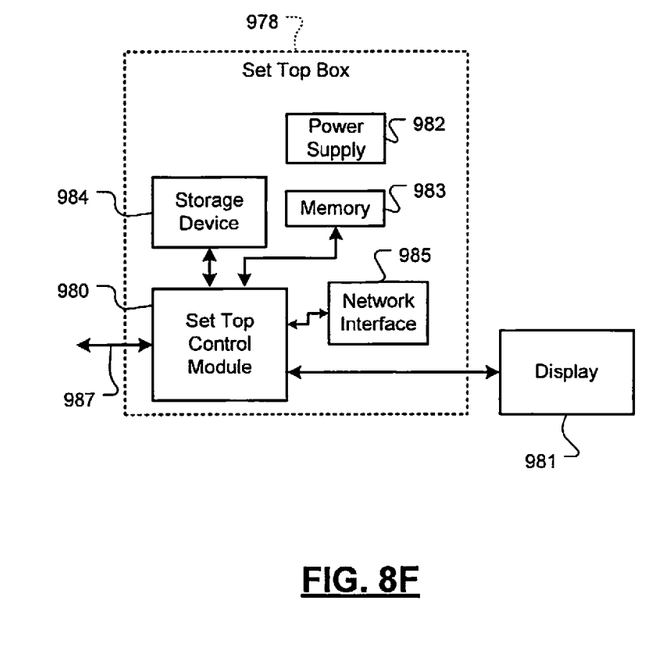
FIG. 8F is a functional block diagram of a set top box.

Referring now to FIG. 8F, the teachings of the disclosure can be implemented in a power supply of a set top box 978. The set top box 978 includes a set top control module 980, a display 981, a power supply 982, memory 983, a storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 8G:
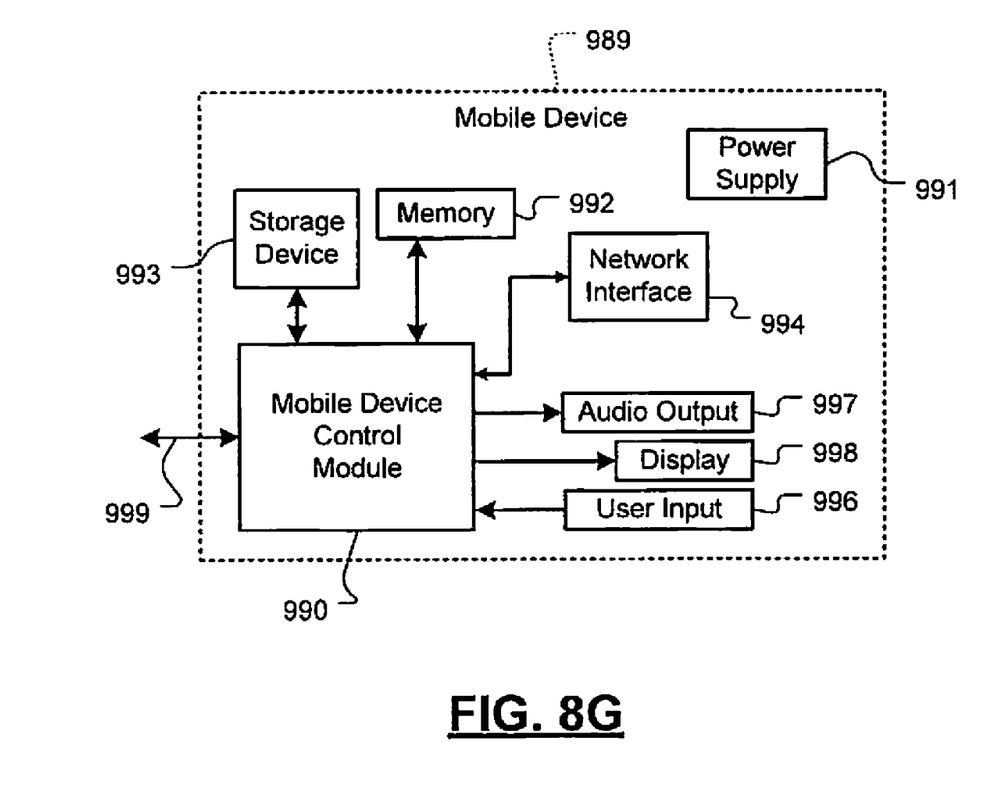
FIG. 8G is a functional block diagram of a mobile device.

Referring now to FIG. 8G, the teachings of the disclosure can be implemented in a power supply of a mobile device 989. The mobile device 989 may include a mobile device control module 990, a power supply 991, memory 992, a storage device 993, a network interface 994, and an external interface 999. If the network interface 994 includes a wireless local area network interface, an antenna (not shown) may be included.

The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A digital low dropout regulator comprising:
a switch;
a resistive element;
a capacitive element coupled to the resistive element at a node; and
a switch controller configured to
couple to the node to receive an output voltage, wherein a first circuit receives power based on the output voltage during an active mode of the first circuit, and wherein the first circuit receives power based on the output voltage during a standby mode of the first circuit,
compare the output voltage to a reference voltage, and control the switch based on a comparison of the output voltage and the reference voltage,
wherein the switch is configured to selectively provide a supply voltage to the node via the resistive element, and
wherein the switch controller is configured to (i) receive a control signal, (ii) prevent the output voltage from decreasing to a voltage less than a minimum voltage based on the control signal including transitioning the switch to an ON state to turn ON the digital low dropout regulator for a predetermined period during the standby mode, and (iii) transition the switch to an OFF state subsequent to the predetermined period and during the standby mode.

2. The digital low dropout regulator of claim 1, wherein the switch controller is configured to turn on the switch when the output voltage is less than the reference voltage.

3. The digital low dropout regulator of claim 1, wherein a ripple voltage at the node is less than 100 mV.

4. The digital low dropout regulator of claim 1, wherein the reference voltage is at least one of (i) represents a voltage floor, or (ii) is equal to the minimum voltage.

5. The digital low dropout regulator of claim 1, wherein the switch controller is a low power comparator.

6. A power management system incorporating the digital low dropout regulator of claim 1, wherein the power management system is configured to engage in one of the standby mode and the active mode.

7. The power management system of claim 6, wherein the digital low dropout regulator is operational during the standby mode.

8. A system-on-chip integrated circuit incorporating the power management system of claim 6.

9. The digital low dropout regulator of claim 1, wherein the switch controller is configured to transition the switch from the ON state to the OFF state prior to operation in the active mode.

10. The digital low dropout regulator of claim 1, wherein the minimum voltage is greater than 0.

11. The digital low dropout regulator of claim 1, wherein:
the switch controller is configured to increase the output voltage above the minimum voltage prior to the active mode to prevent the output voltage from decreasing to a voltage less than the minimum voltage during the predetermined period;
turn ON of the first circuit is initiated during the predetermined period;
the predetermined period occurs prior to the active mode; and
the first circuit is in the active mode when the predetermined period ends.

12. A power management system comprising:
the digital low dropout regulator of claim 1; and
a direct current-to-direct current converter configured to (i) supply the output voltage during the active mode, and (ii) not supply the output voltage during the standby mode,
wherein the digital low dropout regulator is configured to maintain the minimum voltage during the standby mode.

13. The power management system of claim 12, further comprising:
a mode control module configured to generate a pre-active mode signal during (i) the standby mode, and (ii) the predetermined period; and
a power control module configured to turn ON the digital low dropout regulator for the predetermined period based on the pre-active mode signal.

14. The power management system of claim 13, wherein:
the power control module is configured to generate the control signal;
the switch controller is configured to increase the output voltage above the minimum voltage prior to the active mode to prevent the output voltage from decreasing to a voltage less than the minimum voltage during the predetermined period;
turn ON of the first circuit is initiated during the predetermined period;
the predetermined period occurs prior to the active mode; and
the first circuit is in the active mode when the predetermined period ends.

15. The power management system of claim 13, wherein the power control module is configured to (i) generate the reference voltage, and (ii) control a voltage level of the reference voltage.

16. The power management system of claim 12, wherein:
the first circuit does not activate a second circuit during the standby mode based on the output voltage as supplied by the digital low dropout regulator; and
the first circuit activates the second circuit during the active mode based on the output voltage as supplied by the direct current-to-direct current converter during the active mode.

17. The digital low dropout regulator of claim 1, wherein the switch controller is configured to:
account for an increased amount of load at the node as a result of initiating the active mode during the standby mode;

transition the switch to the ON state for the predetermined period to increase the output voltage to a second voltage greater than the minimum voltage based on the increased amount of load;

permit the output voltage to decrease from the second voltage including transitioning the switch to the OFF state prior to the active mode; and set the predetermined period that the switch is in the ON state to prevent the output voltage from decreasing from the second voltage to a voltage less than the minimum voltage during the standby mode.

* * * * *